Sept. 14, 1965  R. R. TRACY  3,205,706
RING-TYPE LOAD CELL
Filed Dec. 4, 1962
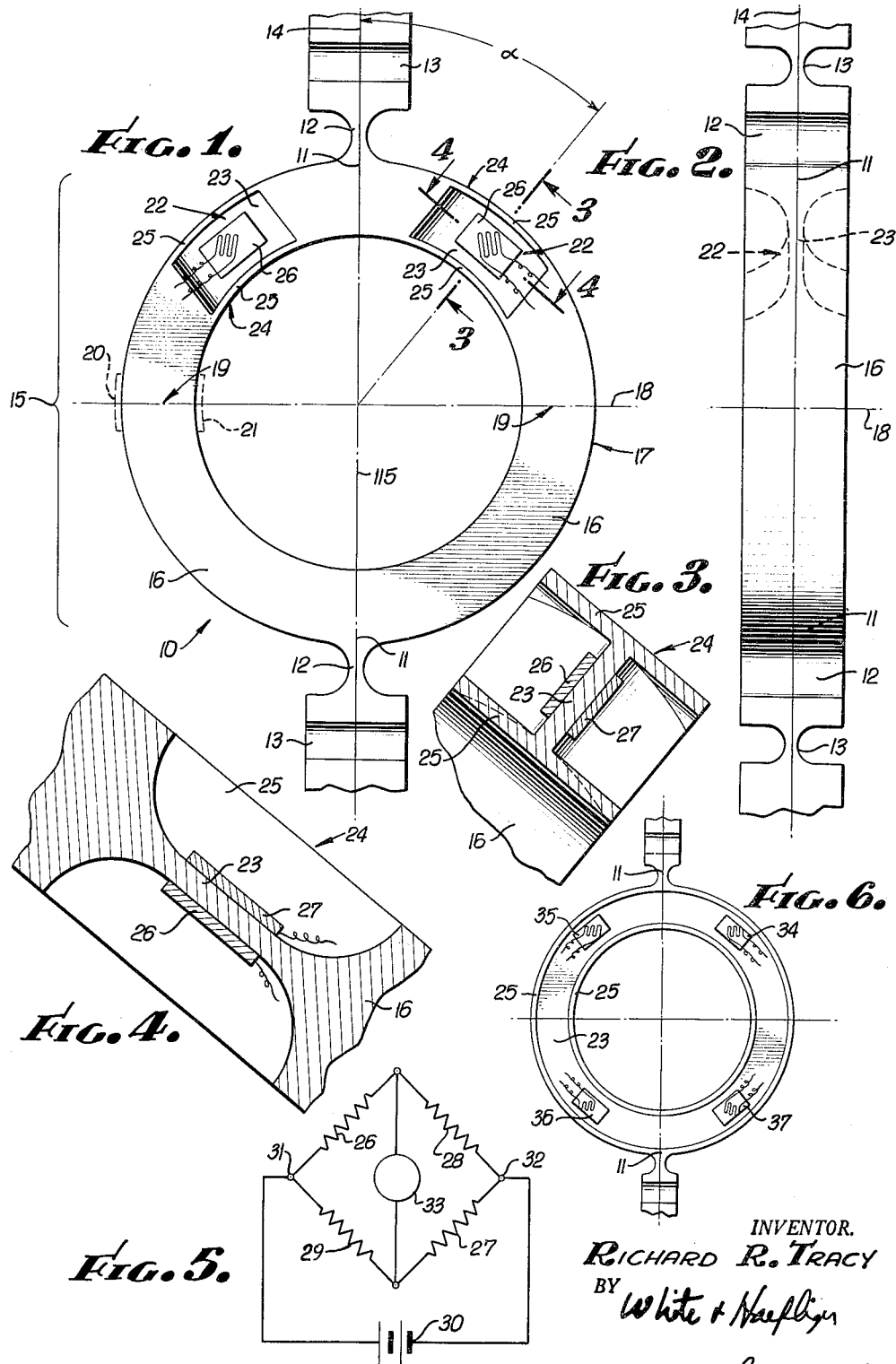
INVENTOR.
RICHARD R. TRACY
BY White & Haefliger
ATTORNEYS.

United States Patent Office
3,205,706
Patented Sept. 14, 1965

1

3,205,706
RING-TYPE LOAD CELL
Richard R. Tracy, Pasadena, Calif., assignor to The Task Corporation, Anaheim, Calif., a corporation of California
Filed Dec. 4, 1962, Ser. No. 242,319
5 Claims. (Cl. 73—141)

This invention relates generally to improvements in what are known as force transducers or dynamometers or load cells, characterized as being subjected in use to application of force producing strain or deformation in the cell body and communicated to the strain gages attached to the body. More particularly, the invention concerns the provision of a novel load cell or force transducer exhibiting linearity between applied force and resultant strain gage indication or output, and also exhibiting very little deflection attending a given level of indication or output.

Load cells are commonly used in connection with the load testing of models or prototypes in order to obtain knowledge as to the magnitudes and directions of forces and moments of force applied to the models or prototypes, as by wind loading, vibration, and the like. They are also used in weighing, thrust measuring, and other applications requiring measurement of a force or forces. The fundamental principle upon which the use of the strain gage support or load cell is founded may be simply stated as consisting in the production of a change in the electrical impedance, such as resistance, of a supported strain gage in accordance with deformation or strain of the surface to which the gage is fastened, the strain being produced by loading the cell. In general, changes in the electrical properties of a strain gage may be made approximately proportional to changes in loading exerted on the gage support, and may be readily measured as voltage or current changes in a circuit of which the gage forms a part.

For the purpose of obtaining electrical measurements of tensile or compressive loading exerted along or parallel to a reference axis, several types of strain gage supports or transducers are employed. They are either configured such as to produce tensile and compressive stresses and strains corresponding to like loading, for example a post situated axially between the means of load application; or they are configured in any of several ways in order to produce bending stresses and strains, for example an eccentric column lying parallel to but displaced laterally from the line of load application, or for example, a ring or oval or similar shape loaded across a diameter or axis of symmetry lying in the plane of the shape. It is inherent in the conception and principle of each of these types that the strain which is communicated to the strain gages is not exactly in proportion to the applied force since in each case the deformations of the body accompanying the development of strain are such as to change the amount of stress, and consequently, strain resulting from a given increment of applied force. In the first example, the cross section of the axial post changes under axial loading due to Poisson's Ratio effect. In the second example the displaced axial column becomes curved due to the development of bending strains with axial loading causing a change in the lateral displacement of the column from the axis, thus changing the sensitivity of the transducer. Likewise, in the third example, loading produces a change in the transverse diameter or dimension, changing the sensitivity of the device with respect to development of bending stresses and strains near these lateral extremities. In summary, any device consisting of an axial member or members in which the application of axial force produces direct axial stresses and strains, or by virtue of a transverse displacement of the member or members or some portion or region thereof, produces

2 bending stresses and strains as well, and which employs strain gages to give an electrical signal proportional to such strains, will exhibit a non-proportionality or non-linearity in the relationship between applied force and electrical output.

It is a major object to the present invention to achieve a substantial reduction tantamount to an elimination of the aforesaid non-proportionality or non-linearity, which reduction is greater than may be achieved from a transducer employing strain gages attached as medium axial or bending strain responsive elements. An additional object is to achieve a transducer characterized by smaller axial deflection for a given level of strain to be measured. Another object is to permit the construction of a transducer which may have a large central hole or passageway, if so desired, without incurring a substantial penalty in axial deflection as compared with a transducer for the same purpose which does not have a large hole or passageway.

These objectives may now be realized through the provision of an improved load cell or dynamometer comprising body means having spaced end portions or zones through which endwise body loading is transmitted and intermediate extent or portion for transmitting the loading between the end zones, the latter extent including one or more first regional parts subject to greater bending moments, and of one or more second regional parts subject to lesser bending moments and to shearing forces. Furthermore, a portion of the second regional part or parts may have reduced cross sectional area, said portion or portions being subject to substantial shear stress development in response to load transmission and also being adapted to support strain gage means to be responsive to the accompanying shear strain development. As will be brought out, the first and second regional parts are spaced apart in the general direction of load transmission through said body intermediate extent, and also the second regional part is typically but not necessarily I-shaped in a plane extending substantially normal to the general direction of load transmission through said extent. The I-shape is desirable from the standpoint of sensitivity to the development of shear stresses, while remaining insensitive to the development of bending and axial stresses, but is not necessary to the functioning of the transducer.

When strain gages are attached to the web portion of the I-shaped cross section, the gage output is found to be proportional to the axially applied force. Furthermore, when the gages and the reduced cross sectional area portions to which they are attached are located at or near the points of inflection as respects the eccentrically located member or members of the body, the strain at the reduced portion is free of any bending contribution thereby relieving the strain gages of that superfluous strain otherwise caused thereby, and preventing bending deflection from accruing at the reduced portion of I-section, as will be brought out.

These and other objects and advantages of the invention, as well as the details of an illustrative embodiment, will be more fully understood from the following detailed description of the drawings, in which:

FIG. 1 is an elevation showing a load cell improved in accordance with the invention;

FIG. 2 is a view of the cell taken at right angles to FIG. 1;

FIG. 3 is an enlarged section taken on line 3—3 of FIG. 1;

FIG. 4 is an enlarged section taken on line 4—4 of FIG. 1;

FIG. 5 is a typical bridge circuit incorporating shear strain gages; and

FIG. 6 is a modified load cell shown in elevation similar to FIG. 1.

Referring first to FIGS. 1 through 4, the load cell or ring dynamometer 10 is illustrated as comprising body means having longitudinally and oppositely spaced end portions or zones 11 through which endwise body loading is transmitted. If such load is transmitted through flexure pivots 12 and 13, as shown, or their equivalents, (although not necessary to the operation of the device) then the loading transmitted to the end zones 11 will be substantially axial or longitudinal in the direction of the axis 14, the latter passing through the end zones 11.

The body means also has intermediate extent or portion 15 through which endwise body loading is transmitted between the end zones 11, such intermediate extent including at least one member displaced laterally from the longitudinal axis 115, such as an eccentric beam column. The specific laterally displaced members 16 shown in FIG. 1 are illustrative only, other forms of such members being usable. The members or branches 16 shown form a ring-shaped member generally designated at 17 and which preferably though not necessarily is annular or circular, so that a transverse plane 18 normal to the axis 14 and midway between the end zones 11 cuts through the beam columns or branches 16 at first regional parts 19 thereof which are subject to maximum bending development. In the past it has been common to attach strain gages to the outer and inner sides of the first regional parts of the branches 16, such gages being indicated by the broken lines 20 and 21, since maximum bending stress development occurs proximate the parts 19.

In accordance with the invention, the branches 16 have second regional parts generally designated at 22, which are separate or spaced from the first regional parts 19, in the general direction of load transmission through the members. Furthermore, each of the second regional parts has a portion of reduced cross sectional area, said portion being shown in one of its possible forms at 23 as comprising the web of an I-shaped section 24 in a plane extending substantially normal (as seen in FIG. 3) to the general direction of load transmission through the second regional part 22. The I-shaped section has a pair of flanges 25 at opposite ends of the web 23 and while the stress due to force directed along the axis of the I-shaped section is approximately proportional to the load transmitted divided by the total area of the section, the shear stress produced in the web is approximately proportional to the shear force divided by the cross sectional area of the web 23 only. For the circular loop shaped configuration exhibited, the shear force exceeds the axial force by approximately 20%. With the web thickness reduced as shown in FIG. 3, the shear stress produced therein may be made very large in relation to the axial stress, as for example ten times as large, and therefore the relatively very large strain resulting from the shear loading of the web 23 may be transmitted to the strain gages 26 and 27 attached to opposite sides of the web, for high output measurement purposes. The strain gages are mounted with the wire resistance grid oriented at 45° to the axis of the section to produce maximum sensitivity to shearing strain and insensitivity to the small axial strain which may be present.

For the circular loop shaped configuration of the branch columns 16, large shearing strain is developed at the reduced cross section portions, such as webs 23, without development of bending strain, when said portions are located at the points of inflection of the loop, that is the points along the branch members at which bending moment is at or near zero. For a circular loop, such points of inflection are located at angles $\alpha$ from the axis 14 which are substantially equal to $39\frac{1}{2}°$. While the invention contemplates that for best results the webs 23 be located at the points of inflection, it is contemplated that the webs may be located at other points along the branch columns, so long as they are sufficiently spaced from the regional parts 19 of maximum bending stress development as to produce satisfactory high shear stress and strain development.

FIG. 5 shows strain gages 26 and 27 connected into a Wheatstone bridge circuit, with dummy gages 28 and 29 connected into the remaining two branches of the circuit. Upon application of voltage supplied by a suitable voltage source 30 to the gage points 31 and 32, the current measuring instrument 33 will register current flow when the gages 26 and 27 are strained in response to shear stress and strain development in the web 23. Accordingly, the instrument 33 may be calibrated to indicate accurately the amount of endwise loading applied to the cell. Similarly, for augmented sensitivity additional gages, say, from another reduced portion opposite axis 14 may replace the dummy gages 28 and 29.

FIG. 6 shows a modified load cell which is the same as that described above, excepting that the I-shaped cross section is continued substantially throughout the circular loop extent by the columns 16. This construction may be used in cases where low weight is critically necessary. Also, gages 34 through 37 are shown applied to the four inflection points of the beam columns 16, the gages being attached to the web of the I-shaped cross section at such points. In this and in other configurations the device is clearly suited to the mounting of sufficient gages to form two or more complete bridges or measuring circuits.

I claim:

1. A ring dynamometer including a ring-shaped member having a reduced thickness web portion to transmit loading productive of shear strain development in the web portion, the web portion being located proximate a point of inflection of the member, and a strain gage supported on the web portion to respond to shear strain in the web portion.

2. The dynamometer of claim 1 in which the member has an I-shaped cross section at said web portion with flanges interconnected by said web portion.

3. A ring dynamometer including a ring-shaped member having branches, each of which has a reduced thickness web portion to transmit loading productive of shear strain development in the web portion, the web portion being located proximate a point of inflection of said branch, and a strain gage supported on the web portion to respond to shear strain in the web portion.

4. The dynamometer of claim 3 in which each branch has an I-shaped cross section at said web portion with flanges interconnected by said web portion.

5. The dynamometer of claim 3 in which said member is annular, the dynamometer having load transmitting connections at diametrically opposite ends of the member to define an axis, and said web portions extend at approximately $39\frac{1}{2}$ degree angles from said axis.

References Cited by the Examiner

UNITED STATES PATENTS

| 2,520,923 | 9/50 | Franzel et al. | 73—141 |
| 2,597,751 | 5/52 | Ruge | 73—141 |
| 3,049,004 | 8/62 | McNamara | 73—141 |

FOREIGN PATENTS 903,941  8/62  Great Britain.

RICHARD C. QUEISSER, *Primary Examiner.*

JOSEPH P. STRIZAK, *Examiner.*